United States Patent
Kelly et al.

(10) Patent No.: US 10,742,816 B2
(45) Date of Patent: Aug. 11, 2020

(54) DYNAMIC ROUTING SYSTEM FOR CONTACT CENTER COMMUNICATIONS

(71) Applicant: Avaya Inc., Santa Clara, CA (US)

(72) Inventors: Edel Kelly, Galway (IE); Patrick Crowley, Galway (IE)

(73) Assignee: Avaya Inc., Santa Clara, CA (US)

( * ) Notice: Subject to any disclaimer, the term of this patent is extended or adjusted under 35 U.S.C. 154(b) by 177 days.

(21) Appl. No.: 15/949,265

(22) Filed: Apr. 10, 2018

(65) Prior Publication Data

US 2019/0312975 A1    Oct. 10, 2019

(51) Int. Cl.
*H04M 3/523* (2006.01)
*H04M 3/51* (2006.01)
*G06Q 10/06* (2012.01)
*G06Q 10/10* (2012.01)
*G06Q 50/00* (2012.01)
*G06Q 30/02* (2012.01)

(52) U.S. Cl.
CPC .... *H04M 3/5233* (2013.01); *G06Q 10/06311* (2013.01); *G06Q 10/101* (2013.01); *G06Q 10/1097* (2013.01); *G06Q 50/01* (2013.01); *H04M 3/5166* (2013.01); *H04M 3/5183* (2013.01); *G06Q 30/02* (2013.01); *H04M 2203/402* (2013.01); *H04M 2203/403* (2013.01); *H04M 2203/655* (2013.01)

(58) Field of Classification Search
None
See application file for complete search history.

(56) References Cited

U.S. PATENT DOCUMENTS

| 6,614,903 B1 * | 9/2003 | Flockhart | G06Q 10/06 379/265.12 |
| 7,167,899 B2 | 1/2007 | Lee et al. | |
| 8,463,939 B1 | 6/2013 | Galvin et al. | |

(Continued)

FOREIGN PATENT DOCUMENTS

EP    1109385    6/2001

OTHER PUBLICATIONS

"Altocloud features," altocloud, 2016, 7 pages [retrieved online from: www.altocloud.com/altocloud-features].

(Continued)

*Primary Examiner* — Harry S Hong
(74) *Attorney, Agent, or Firm* — Sheridan Ross P.C.

(57) ABSTRACT

Information is gathered in real-time from one or more information sources monitored by a contact center. For example, information may be gathered from social media sites and routing hardware in the contact center. The gathered information is about a product and/or service managed by the contact center. The gathered information is analyzed in real-time to determine a potential impact on communications with the contact center. For instance, the gathered information is analyzed to determine how it impacts voice calls in the contact center. The communications with the contact center are routed based on a skill group. In response to determining that there is a potential impact on the communications with the contact center, the system dynamically creates a new skill group and/or modifies the skill group. New communications are then routed to an agent in the new skill group and/or in the modified skill group.

20 Claims, 7 Drawing Sheets

(56) References Cited

U.S. PATENT DOCUMENTS

| | | | |
|---|---|---|---|
| 8,731,177 B1 | 5/2014 | Kiefhaber et al. | |
| 9,454,760 B2 | 9/2016 | Klemm et al. | |
| 9,516,169 B2 | 12/2016 | Reilly et al. | |
| 9,552,397 B2 | 1/2017 | Klemm et al. | |
| 9,621,726 B2* | 4/2017 | Milstein | H04M 3/4872 |
| 9,904,728 B2* | 2/2018 | Bauchot | G06F 16/353 |
| 2003/0152212 A1* | 8/2003 | Burok | G06Q 10/06 379/265.02 |
| 2012/0011208 A1* | 1/2012 | Erhart | G06Q 10/107 709/206 |
| 2012/0072358 A1* | 3/2012 | Famous | G06O 50/01 705/319 |
| 2012/0278115 A1* | 11/2012 | Acharya | G06Q 30/02 705/7.13 |
| 2012/0300920 A1 | 11/2012 | Fagundes et al. | |
| 2015/0161216 A1 | 6/2015 | Skiba et al. | |

OTHER PUBLICATIONS

Extended Search Report for European Patent Application No. 19168447.1, dated Jun. 27, 2019 8 pages.

* cited by examiner

DYNAMIC ROUTING SYSTEM FOR CONTACT CENTER COMMUNICATIONS

FIELD

The disclosure relates generally to contact centers and particularly to systems for routing communications in a contact center.

BACKGROUND

Contact centers typically use static routing mechanisms. For example, a contact center may have static/hard-coded routing models and pre-defined skill groups/contact center queues that handle incoming communications into the contact center. Incoming communications, such as voice calls, are routed based on predefined skill groups/contact center queues. This can cause problems when unexpected volumes of communications are received at the contact center for a particular skill group or for a new problem that is not related to a predefined skill group. Because the contact center has fixed/hard-coded routing models, skill groups, and contact center queues, it is often difficult to quickly reconfigure the contact center to handle the unexpected volumes of communications.

SUMMARY

These and other needs are addressed by the various embodiments and configurations of the present disclosure. Information is gathered in real-time from one or more information sources monitored by a contact center. For example, information may be gathered from social media sites and routing hardware in the contact center. The gathered information is about a product and/or service managed by the contact center. The gathered information is analyzed in real-time to determine a potential impact on communications with the contact center. For instance, the gathered information is analyzed to determine how it potentially impacts incoming voice calls in the contact center. The communications with the contact center are routed based on a skill group. In response to determining that there is a potential impact on the communications with the contact center, the system dynamically creates a new skill group and/or modifies an existing skill group. New communications are then routed to an agent in the new skill group and/or in the modified skill group. For example, a new voice call may be routed to a contact center agent or an automated agent in a newly created skill group.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "skill group" may include any type of definition that includes, skills (e.g., agent skills). In addition, a skill group may include a broader definition that includes attributes (e.g., an attribute group), such as support (e.g., supports a specific type of communication), available, offline, online, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
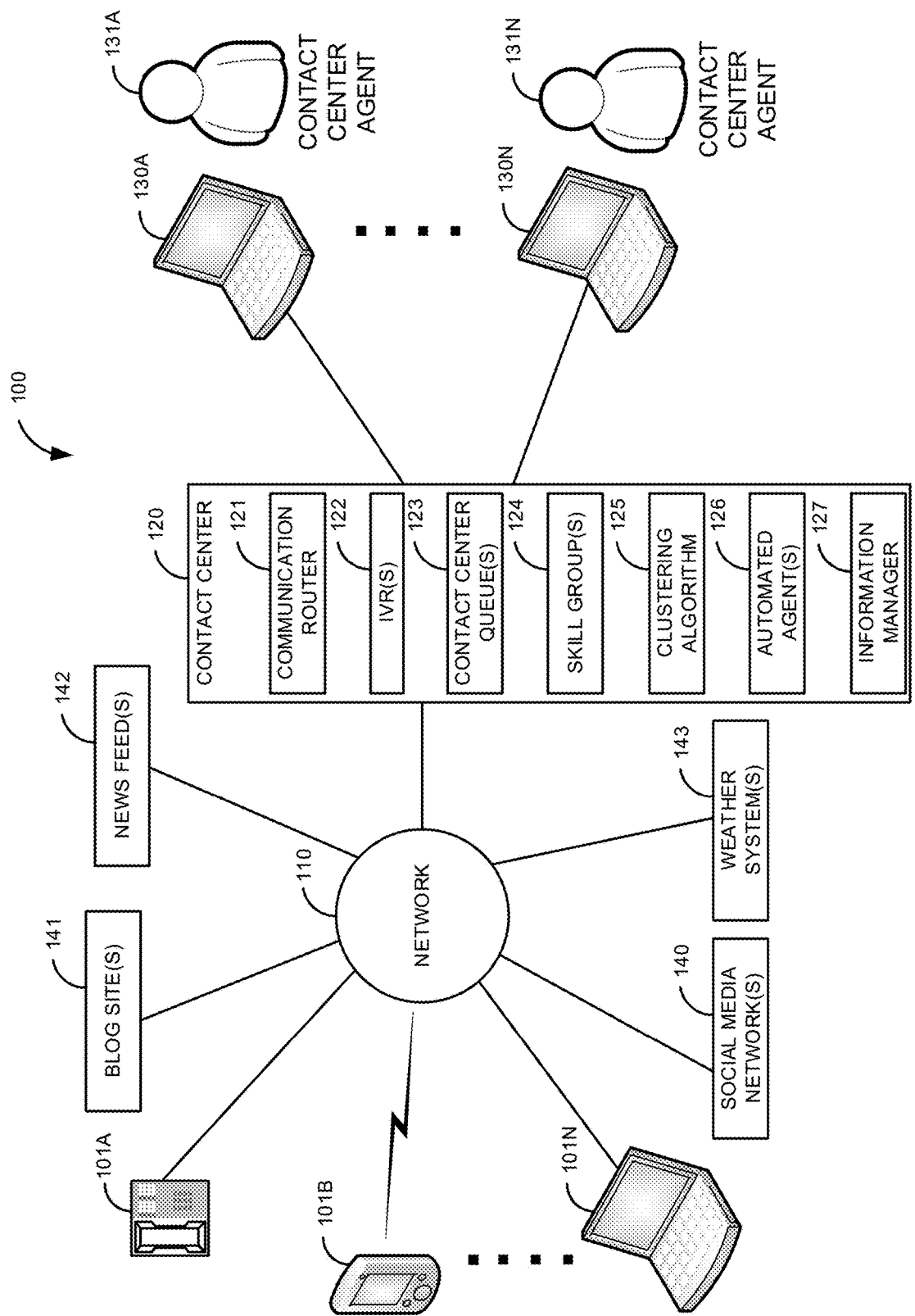
FIG. 1 is a block diagram of a first illustrative system for dynamically managing skill groups for routing communications in a contact center.

FIG. 1 is a block diagram of a first illustrative system 100 for dynamically managing skill groups 124 for routing communications in a contact center 120. The first illustrative system 100 comprises communication endpoints 101A-101N, a network 110, the contact center 120, agent terminals 130A-130N, social media network(s) 140, blog site(s) 141, news feed(s) 142, and weather system(s) 143. The contact center 120 typically also has contact center agents (human agents) 131A-131N that service communications in the contact center 120.

The communication endpoints 101A-101N can be or may include any communication endpoint device that can communicate with the contact center 120, such as a Personal Computer (PC), a telephone, a video system, a cellular telephone, a Personal Digital Assistant (PDA), a tablet device, a notebook device, a smart phone, and the like. The communication endpoints 101A-101N are devices where a communication sessions ends. The communication endpoints 101A-101N are not network elements that facilitate and/or relay a communication session in the network 110, such as a communication manager or router. As shown in FIG. 1, any number of communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), H.323, video protocols, email protocols, cellular protocols, Instant Messaging (IM) protocol, and/or the like. Thus, the network 110 is an electronic communication network 110 configured to carry electronic messages via packets and/or circuit switched communications.

The contact center 120 can be or may include any hardware coupled with software that can manage communications (incoming and/or outgoing) that are routed to and/or from agents. The contact center 120 may comprise multiple distributed contact centers 120. For example, the contact center 120 may comprise a contact center 120 in the United States and a contact center 120 in India.

The contact center 120 further comprises a communication router 121, Interactive Voice Response (IVR) system(s) 122, contact center queue(s) 123, skill group(s) 124, a clustering algorithm 125, automated agent(s) 126, and an information manager 127. The communication router 121 can be any hardware coupled with software that can route communications in the contact center 120, such as a Private Branch Exchange (PBX), a switch, a session manager, a communication manager, a router, an email system, an instant messaging system, a text messaging system, a video switch, and/or the like. The communication router 121 can route various kinds of communications, such as voice calls, video calls, Instant Messaging (IM), text messaging, emails, virtual reality communications, and/or the like.

The IVR system(s) 122 can be or may include any hardware coupled with hardware that can provide interactive voice communications with a caller. The IVR system(s) 122 may comprise a series of menus that allow a caller to navigate to a contact center queue 123 and/or skill group 124. In one embodiment, the IVR system 122 may be a video IVR system 122 that presents a video avatar that provides interactive voice/video communications.

The contact center queue(s) 123 are queues for holding incoming and/or outgoing communications for the contact center 120. The contact center queue(s) 123 can hold similar types of communications (e.g., voice calls only) or different types of communications (e.g., voice, video, text messaging, virtual reality, email, and/or IM communications). The contact center queue(s) 123 may be implemented in various manners, such as, on a first-in-first-out (FIFO) basis. In some embodiments, calls may be placed higher in the contact center queues 123 based on various metrics. For example, a gold customer (a paying customer) may get preferential treatment over other non-paying customers by being placed higher in a contact center queue 123. The contact center queue(s) 123 may be dynamically defined to have different amounts and/or types of communications that can be held in the contact center queue(s) 123. For example, a contact center queue 123 may be initially configured to support twenty voice calls and one hundred emails. Later, the same contact center queue 123 may be dynamically configured to support twenty five voice calls and thirty IM sessions.

Although not shown, the contact center 120 may be implemented as a queue-less contact center 120. In a queue-less contact center 120, the communications are placed into a pool where contact center agents 131 may select which contacts are to be worked on.

The skill group(s) 124 are groups that are typically associated with one or more products and/or services that are supported by the contact center agents 131. For example, a first skill group 124 may be created to support high definition televisions and a second skill group 124 may be created to support laptop computers. A skill group 124 is typically associated with a contact center queue 123. In some embodiments, there may be an individual skill group 124 for each contact center queue 123 (a one-to-one ratio). Alternatively, a skill group 124 may be associated with two or more contact center queues 123 or a contact center queue 123 may be associated with two or more skill groups 124. One of skill in the art could envision various combinations of contact center queue(s) and 123/skill group(s) 124. A skill group(s) 124 may comprise human agent(s) (e.g., contact center agents 131A-131N) and/or non-human agent(s) (e.g., IVR system(s) 122/automated agent(s) 126).

A skill group 124 may be specific to a particular communication type. For example, a product/service may have separate skill groups 124 for voice, video, email, IM, text messaging, and virtual reality communications. Alternatively, skill groups 124 may support all or only a portion of the supported communication types.

In one embodiment a skill group 124 may be a web chat form where communications are routed to the web chat from. The web chat form may be a social media network 140/blog site 141 where users can discuss an issue managed by the contact center 120 to resolve a problem and/or issue. The web chat form may be supervised by one or more contact center agents 131 and/or a supervisor.

The clustering algorithm 125 can comprise one or more clustering algorithms 125, such as K-means, Fuzzy C-means, Gaussian, EM clustering, affinity propagation, and/or the like. The clustering algorithm 125 may take input from various information sources, such as, the communication router 121, the IVR system(s) 122, the contact center queue(s) 123, the skill group(s) 124, the automated agent(s) 126, the social media network(s) 140, the blog site(s) 141, the news feed(s) 142, the weather system(s) 143, and/or the like to cluster agents into the skill group(s) 124. The agents that are clustered to create the skill group(s) 124 may be the contact center agents 131A-131N (human agents) and/or non-human agents (e.g., the IVR system(s) 122 and the automated agents 126).

The automated agent(s) 126 can be or may include any hardware coupled with software that can automatically respond to a communication. For example, the automated agent 126 may respond automatically to an email based on the subject matter of the email. Alternatively, the automated agent 126 may automatically respond to a voice communication (e.g., by using an IVR system 122), a video communication (e.g., by playing a video that answers the customer's questions), an IM communication, a text message, a virtual reality response, and/or the like.

The information manager 127 can be or may include any hardware coupled with software that can gather and manage information from various sources, such as the communication router 121, the IVR system(s) 122, the contact center queue(s) 123, the skill group(s) 124, the automated agent(s) 126, the social media network(s) 140, the blog site(s) 141, the news feed(s) 142, the weather system(s) 143, and/or the like. The information manager 127 gathers information from various places that are relevant to the contact center's products and services.

The agent terminals 130A-130N can be or may include any communication devices used by the contact center agents 131A-131N to handle incoming/outgoing communications, such as a communication endpoint 101. The agent terminals 130A-130N may comprise multiple communication devices. For example, a contact center agent 131 may have a telephone and a desktop computer to handle communications for the contact center 120. In FIG. 1, the contact center agents 131A-131N may be any kind of contact center agent 131 that supports products and/or services, including supervisors.

The social media network(s) 140 can be or may include various kinds of social media networks 140, such as Facebook®, Twitter®, Linkedin®, a corporate social media network 140, an online form, and/or the like. The blog site(s) 141 can be or may include any type of blog site, such as Blog.Com, Blogger.Com, Squarespace.Com, Wix.Com and/or the like. The news feed(s) 142 can be or may include various type of news feeds 142, such as ABC News®, Yahoo News®, Google News®, Reuters®, ESPN®, RSS feeds, and/or the like. The weather system(s) 143 can be or may include any types of weather system(s) 143 and/or weather web site(s) that provide information concerning weather.

Figure 2:
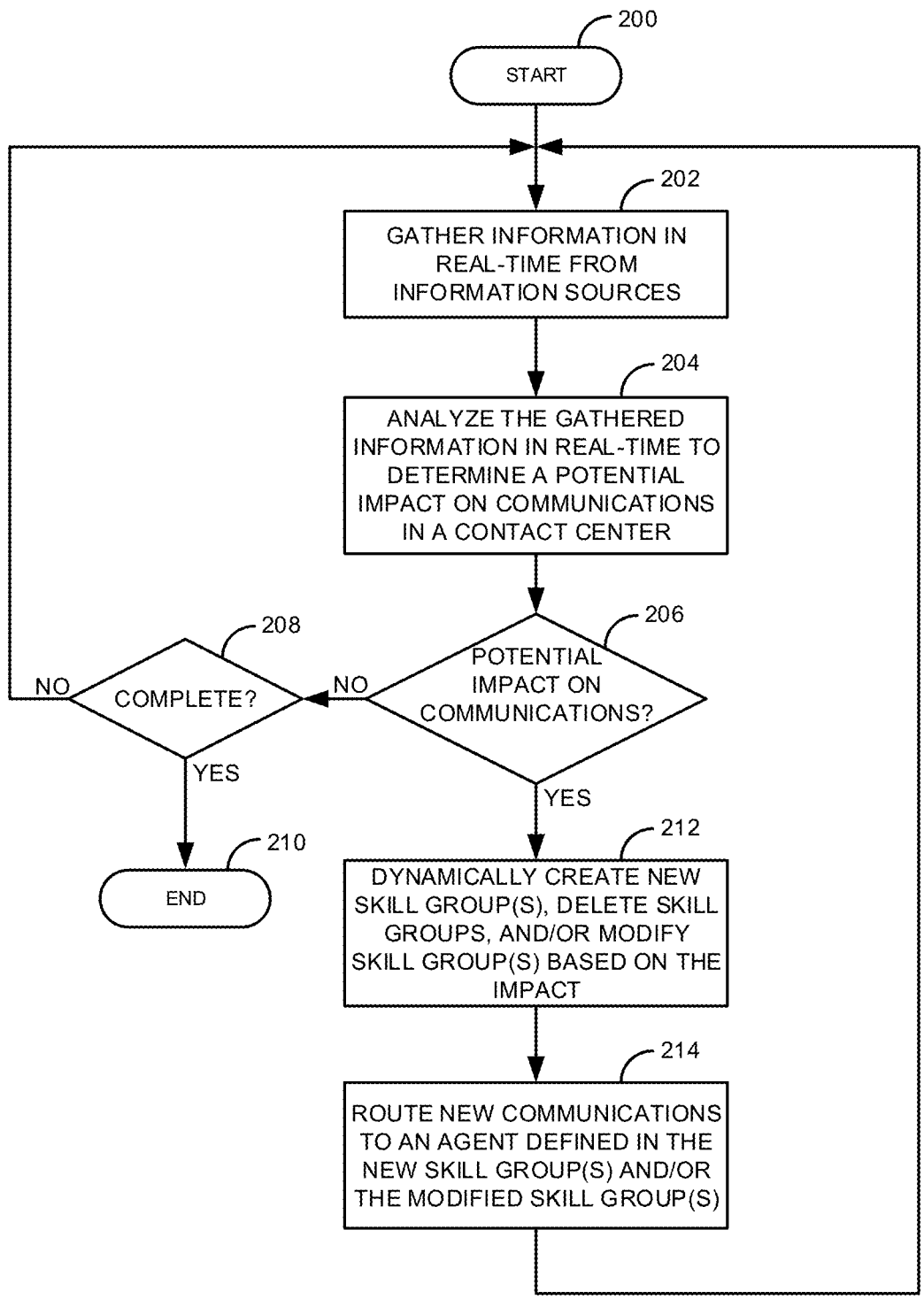
FIG. 2 is a flow diagram of a process for dynamically managing skill groups for routing communications in a contact center.

FIG. 2 is a flow diagram of a process for dynamically managing skill groups 124 for routing communications in a contact center 120. Illustratively, the communication endpoints 101A-101N, the network 110, the contact center 120, the communication router 121, the IVR system(s) 122, the contact center queue(s) 123, the skill group(s) 124, the clustering algorithm 125, the automated agent(s) 126, the information manager 127, the agent terminals 130A-130N, the social media network(s) 140, the blog site(s) 141, the news feed(s) 142, and the weather system(s) 143 are stored-program-controlled entities, such as a computer or microprocessor, which performs the method of FIGS. 2-7 and the processes described herein by executing program instructions stored in a computer readable storage medium, such as a memory (i.e., a computer memory, a hard disk, and/or the like). Although the methods described in FIGS. 2-7 are shown in a specific order, one of skill in the art would recognize that the steps in FIGS. 2-7 may be implemented in different orders and/or be implemented in a multi-threaded environment. Moreover, various steps may be omitted or added based on implementation.

The process starts in step 200. The information manager 127 gathers, in step 202, information in real-time from information sources, such as the communication router 121, the IVR(s) 122, the contact center queue(s) 123, the skill group(s) 124, the automated agent(s) 126, the social media network(s) 140, the blog site(s) 141, the news feed(s) 142, the weather system(s) 143, and/or the like. The information manager 127 may gather information from other sources and communication systems (not shown), such as databases (e.g., a customer history/product/service database), networking devices (e.g., a routers and/or email systems), and/or the like. The information manager 127 gathers information that is pertinent to products and/or services supported by the contact center 120 to identify emerging trends. By identifying emerging trends in real-time, the contact center 120 can be dynamically configured in real-time to better support the emerging trends. The information manager 127 may also alert a supervisor of the emerging trends so that the supervisor can manually make changes and/or approve the dynamic changes to the contact center 120.

The information manager 127 can gather information in various ways. For example, the information manager 127 may monitor incoming and/or outgoing communications with the contact center 120. The information manager 127 may monitor voice, video, IM, email, text, and/or virtual reality communications for key words to identify trends that are occurring. For instance, the information manager 127 may identify that there is a specific type of problem in a newly released video game serviced by the contact center 120 by identifying keywords (e.g., the name of the video game, the word "problem," and the phrase "cannot complete level five") in communications coming into the contact center 120. The keywords may trigger an action (e.g., to reconfigure routing of communications) based on a number of keyword hits (i.e., a threshold). In addition, additional information (e.g., from information sources 140-143) may be used in conjunction with the keywords. For example, the same problem being discussed on the social media network 140 and also in one of the news feeds 142 may be used along with the keyword hits to identify the problem. Alternatively, another application may identify keywords or information and then provide the information to the information manager 127.

The information manager 127 may gather information from the IVR system(s) 122. For example, the information manager 127 may get menu selections made by callers from the IVR system(s) 122. The information manager 127 may learn that a selection of a menu item (i.e., for a specific product) has increased 300% in the last twenty four hours. The information manager 127 may learn dissatisfaction of customers by monitoring a caller's voice (e.g., tone/inflection) with the IVR system 122 and/or while the caller is on hold in a contact center queue 123. The information manager 127 can determine information from gestures, facial expressions, movements, and/or the like in a video communication with a caller. The information manager 127 may use call volume, email volume, IM volume, text messaging volume, virtual reality communication volume, volume of postings on the social media network 140, and/or the like. The information gather 127 may get information form the contact center queue(s) 123, such as the number of communications that are currently waiting to be serviced in the contact center queue(s) 123. Information may be captured from the skill group(s) 124, such as the types of skills each skill group 124/contact center agent 131 currently possesses. The information manager 127 may get information from the automated agents 126. For example, information manager 127 may determine how many communications the automated agents 126 are currently servicing. The information manager 127 may receive customer feedback regarding the information provided by the automated agent(s) 126 as an input in step 202.

The information manager 127 may gather information based on feedback provided by the contact center agents 131A-131N. As the contact center agents 131A-131N manage communications in the contact center 120, a contact center agents 131 may identify a problem and may also identify a solution to the problem. This information can be sent to other contact center agents 131 so they can quickly resolve the problem. The information may also be sent to the automated agents 126 so that when a customer is identified to have the same problem, the automated agent 126 can automatically respond without having to involve a contact center agent 131.

The information manager 127 may gather information from the weather system(s) 143. For example, the contact center 120 may be a 911 call center. If the weather system(s) 143 indicate that there may be a severe weather condition (e.g., a tornado in a specific area), the information manager 127 can use this information to dynamically reconfigure the contact center 120 to handle additional incoming calls based on the weather condition.

The above discussion describes various systems and ways that information may be captured. One of skill in the art would recognize that the information manager 127 may use various combination of what is discussed above to dynamically reconfigure the contact center 120 to manage an emerging trend.

The information manager 127 analyzes, in step 204, the gathered information in real-time to determine a potential impact on how communications are routed/managed in the contact center 120. The information (e.g., a trend) may project a potential impact on the contact center 120 in various ways, such as, a detecting new pattern in data about the product and/or service, detecting a potential increase/decrease in call volumes, detecting a potential increase/decrease in email volumes, detecting a potential increase/decrease in chat room activity, detecting a potential increase/decrease in social media posts, detecting a potential increase/decrease text messaging, a potential increase/decrease in virtual reality communications, and/or the like. For example, detecting a new pattern may be based on an increased volume of mentions of a feature in product that causes the creation of one or more new skill groups 124. Mentions that are positive, for example, could be ignored while only negative ones are tagged. Mentions in external data (e.g., from social media networks 140) are linked to result in anticipated surges in contact center communications that have improved routing because the newly created skills groups 124. The detection of new patterns may be based on specified rules or profiles are specific to the contact center 120.

The potential increase and/or decrease in communications may be for a specific skill group 124. For example, an unexpected software bug that was introduced by a new software patch to Product Y may project an increased volume of calls and emails to the contact center 120 for Product Y. The impact is that the current group of contact center agents 131 that support a skill group 124 for Product Y may not have enough contact center agents 131 in the skill group 124 to support the projected increased call/email volume.

The potential increase/decrease in communications may be only for a specific type of communications. For example, even though a newly released product performs as advertised, there is customer dissatisfaction with a particular user interface in the product. Based on the analyzed information, increased communications are projected on social media networks 140 or chat forms where contact center agents 131 respond to posts by dissatisfied customers. In this example, incoming call/email volume may be expected to remain relatively constant.

The impact on communications may be based on factors not related to projected communication volume(s). For example, even though the projected incoming call volume is not projected to change, the impact may be to change routing in the contact center 120 by reconfiguring one or more menus on an IVR system 122. In this case, the IVR system 122 does not route an incoming call to a contact center agent 131, but instead, the reconfigured IVR menu may tell the caller that the contact center 120 is aware of the problem and to go to a particular web site to get an updated software patch.

The impact on communications may be change how incoming emails (or other types of communications) are routed in the contact center 120. For example, using the example discussed above, the communication router 121, after viewing the content of the email to learn that it is about the problem related to the updated software patch, may automatically create an instance of the automated agent 126 and then route an incoming email to the newly created instance of the automated agent 126 instead of routing the email to a contact center agent 131. The newly created instance of the automated agent 126 then responds to the email that the contact center 120 is aware of the problem and to go to the particular web site to get the updated software patch.

The impact on communications may be to give a user different options in a virtual reality display. For example, initially the virtual reality display may allow the user to go and virtually talk to a contact center agent 131 in a virtual reality environment. However, based on the analyzed information of step 204, the user may now see a group of other users (i.e., like a virtual reality web chat form) that the user can go to and discuss the problem. In this case, the communication router 121 routes the user to the group of other users in the virtual reality environment. In one virtual reality view, the virtual reality environment now displays a billboard that tells the user to go to the particular web site and get the software patch. The user can then click on the billboard (or go and touch the billboard using a controllable avatar) and get directed to the web site that has the software patch.

The potential impact on communications may cause the information manager 127 to push information to an application on a user communication endpoint 101. For example, the user may have downloaded a contact center application on a communication endpoint 101. When the impact on potential communications is determined, the contact center application may be activated in the communication endpoint 101 and display a newly defined set of communication routing options that allow the user to initiate one or more communications in the contact center 120. For example, a new routing option may be displayed to the user to directly call into a newly created contact center queue 123 by clicking on a displayed button in the contact center application.

The information manager 127 determines, in step 206, if there is a determined impact on communications in the contact center 120. If there is not a determined impact on communications in step 206, the information manager 127 determines if the process is complete in step 208. If the process is complete in step 208, the process ends in step 210. Otherwise, if the process is not complete in step 208, the process goes back to step 202 to continue to gather information in real-time.

If there is a potential impact on communications in step 206, the information manager 127 dynamically creates, deletes, and/or modifies, in step 212, one or more skill groups 124 based on the analyzed information. In step 212, all combinations of creating, deleting, and/or modifying of skill groups 124 are envisioned. For example, in step 212, a new skill group 124 may be created and a skill group 124 may be deleted while no skill groups 124 are modified. In step 212, an existing skill group 124 may be modified and a new skill group 124 may be created without deleting a skill group 124.

New communications in the contact center 120 are then routed, in step 214, to an agent (human or non-human agent) defined in the new skill group 124 and/or modified skill group 124. If the potential impact is to only delete one or more skill groups 124 (i.e., there is no longer a need for the one or more skill groups 124), the new communication will be routed to existing skill groups 124.

To further illustrate the process of FIG. 2, consider the following example. The contact center 120 sells and provides technical support for Product Y. The contact center 120 supports two types of communications: 1) voice calls and 2) emails. There are two skill groups 124 currently defined in the contact center 120 for Product Y: 1) sales for Product Y (email and voice) and 2) technical support for Product Y (email and voice).

The information manager 127 monitors in real-time (step 202) a news feed 142 where Product Y just received a highly positive review. At the same time, the information manager 127 monitors in real-time (step 202) the social media network 140 for Product Y. On the social media network 140, there is discussion where multiple customers are giving glowing reviews for Product Y that are much more positive than expected. In addition, the communication router 121 has started receiving a 20% increase in incoming calls and emails regarding purchases of Product Y. Based on the information from these sources, the information monitor 127 determines, in steps 204/206 that there is a potential impact on the contact center 120 (a potential increase in communications).

The information monitor 127 dynamically modifies in real-time (i.e., automatically performing step 212) the existing sales skill group 124 for Product Y by adding twenty additional contact center agents 131 to the existing sales skill group 124 for Product Y. In addition, the information monitor 127 modifies (step 212) the existing sales skill group 124 to only support voice calls (it previously supported both voice and emails). The information monitor 127 creates (step 212) a new sales skill group 124 to support only emails and adds ten new contact center agents 131 to the newly created sales email skill group 124. New incoming voice calls are then routed to the sales voice skill group 124 and incoming emails are then routed to the newly created sales email skill group 124.

Figure 3:
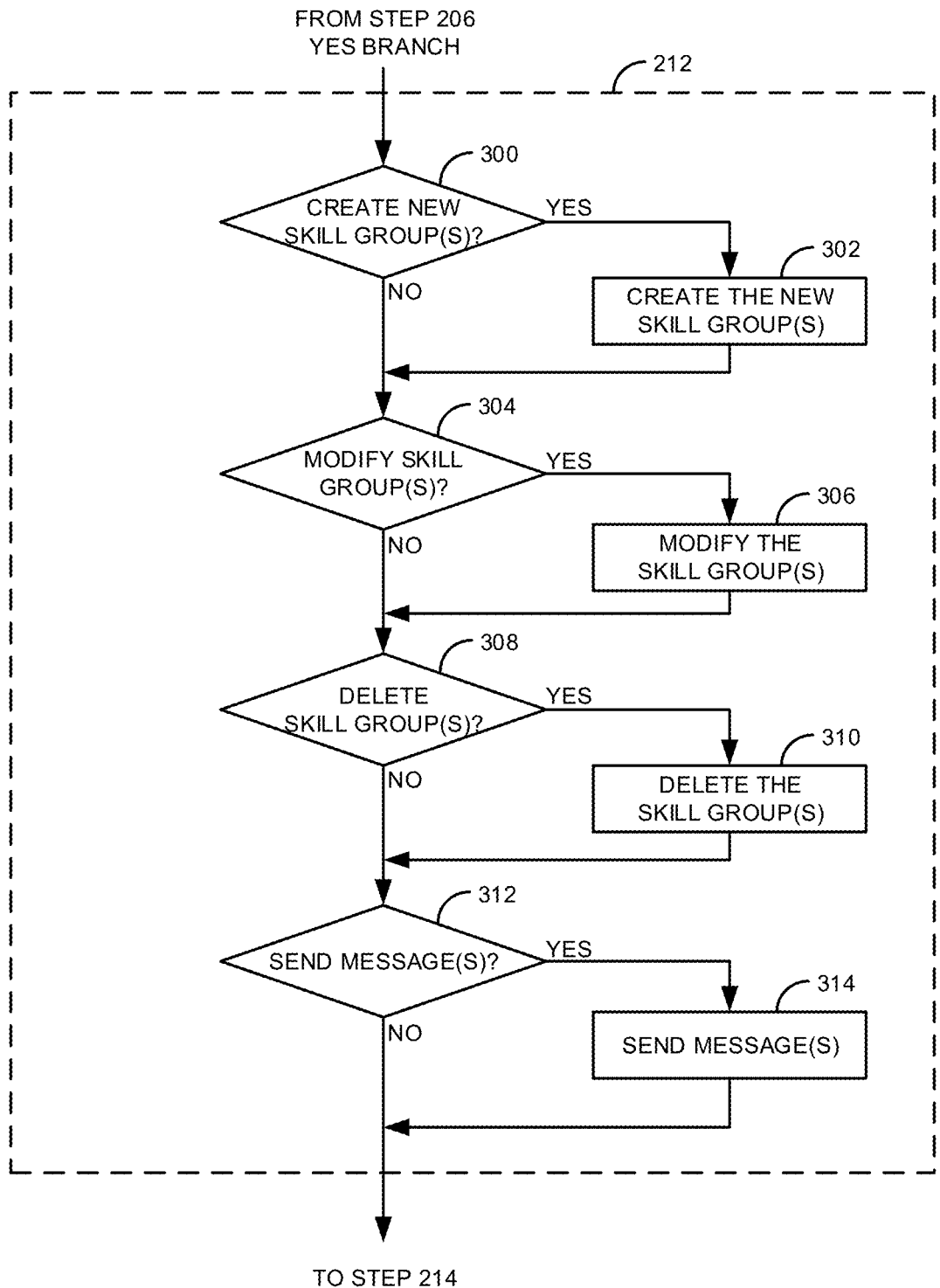
FIG. 3 is a flow diagram of a process for dynamically managing skill groups for routing communications in a contact center.

FIG. 3 is a flow diagram of a process for dynamically managing skill groups 124 for routing communications in a contact center 120. The process of FIG. 3 is an expanded view of step 212 of FIG. 2. After determining, in step 206, that that there is a potential impact on the contact center 120, the information manager 127 determines, in step 300, if one or more new skill groups 124 are to be created. If there is not a skill group 124 to be created in step 300, the process goes to step 304. Otherwise, if a skill group 124 is to be created in step 300, a new skill group 124 is created in step 302. A skill group 124 may be created based on a variety of factors, such as based on a new feature of a product, a new problem, a change in a product, a new demand for a product or service, a specific type of support, and/or the like. A newly created skill group 124 may comprise human and/or non-human agents. The process then goes to step 304.

In step 304, the information manager 127 determines if one or more existing skill groups 124 are to be modified. If there are not any skill groups 124 to be modified in step 304, the process goes to step 308. Otherwise, if the information manager 127 determines, in step 304, that one or more of the existing skill groups 124 are to be modified, the information manager 127 modifies, in step 306, the one or more existing skill groups 124. The information manager 127 can modify an existing skill group 124 in various ways. For instance, the information manager 127 may add agents or remove agents from the existing skill group 124 based on factors, such as, a projected increase or decrease in demand for the skill group 124. The information manager 127 may dynamically add or remove contact center agents 131 based on feedback of proficiency in handling communications. For instance, the information manager 127 may dynamically add a contact center agent 131 after the contact center agent 131 has indicated completion of a training video on a particular product.

The information manager 127 may add a new type of agent to the existing skill group 124. For example, the information manager 127 may add an automated agent 126 to an existing skill group 124 that only had contact center agents 131 or add a contact center agent 131 to a skill group 124 that only included automated agents 126. After modifying the skill group(s) 124, the process goes to step 308. In one embodiment, modifying the skill group 124 may be deleting and/or adding a specific type of communication from the skill group 124. For instance, the modification may be to remove email communications from a skill group 124 that supports audio/video/email communications. The process then goes to step 308.

The information manager 127 determines, in step 308, if there are one or more skill groups 124 to delete. If there are no skill groups 124 to delete in step 308, the process goes to step 312. Otherwise, if there are one or more skill groups 124 to delete in step 308, the one or more skill groups 124 are deleted in step 310 and the process goes to step 312. The one or more skill groups 124 can be deleted based on various criteria, such as, when a projected demand for the skill group 124 falls below a threshold, when a demand for another skill group 124 goes above a threshold, and/or the like. For example, a skill group 124 may be deleted when an incoming call volume falls below a specific threshold. The process then goes to step 312.

In step 312, the information manager 127 determines if there are any messages to be sent to the contact center agents 131. If there are not any messages to send in step 312, the process goes to step 214. Otherwise, if there are message(s) to be sent in step 312, the information manager 127 sends, in step 314 the message(s) to the contact center agents 131. The message(s) sent in step 314 may vary based on whether the skill group(s) 124 and/or contact center queues 123 (discussed below in FIGS. 3-6) were deleted, modified, and/or created. For instance, if a skill group 124 was modified by adding additional contact center agents 131, the information manager 127 may send a message only to the newly added contact center agents 131 to tell the newly added contact center agents 131 that they have been added to an existing skill group 124. If a contact center agent 131 was in a deleted skill group 124, the message may indicate that the skill group 124 has been deleted and that the contact center agent 131 has been added to another skill group 124. The message may indicate that the agent was added to a new skill group 124 and removed from an existing skill group 124.

In one embodiment, in step 314, the message may contain a training video. The message indicates that the contact center agent 131 must review the training video and click on a link at the end of the training video. When the user clicks on the link at the end of the training video, the information manager 127 dynamically adds the contract center agent 131 to the new or modified skill group(s) 124 (of steps 302/306). After sending the messages in step 314, the process goes to step 214.

Figure 4:
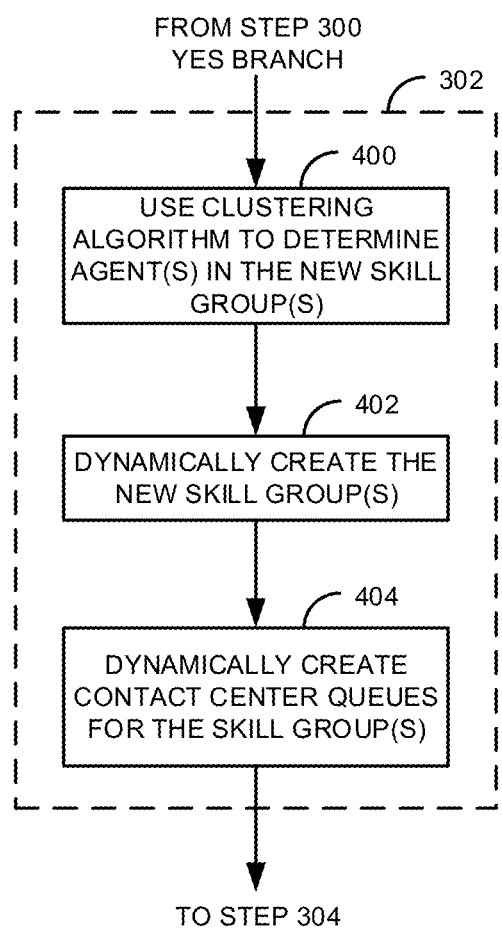
FIG. 4 is a flow diagram of a process for dynamically creating new skill groups/contact center queues in a contact center.

FIG. 4 is a flow diagram of a process for dynamically creating new skill groups 124/contact center queues 123 in a contact center 120. FIG. 4 is a detailed view of an embodiment of step 302 of FIG. 3 in a contact center 120 that uses contact center queues 123.

After determining that one or more skill groups 124 are to be created in step 300, the information manager 127 uses the clustering algorithm 125, in step 400, to determine the contact center agents 131/automated agents 126 in the new skill group(s) 124. The clustering algorithm 125 may determine the agents in the new skill groups 124 based on various factors, such as skills of a contact center agent 131, experience of a contact center agent 131, current staffing requirements (i.e., adding an automated agent 126 to the new skill group 124 to better handle a high load when there are not enough contact center agents 131 available), a projected staffing requirement, a problem resolution (i.e., adding an automated agent 126 because a solution has been determined for a problem), and/or the like. The process of assigning agents to the new skill group(s) 124 may include removing agents from one or more existing skill groups 124. Based on the clustering algorithm 125, the information manager 127 dynamically creates the one or more skill groups in step 402.

If the contact center 120 also uses contact center queues 123, a corresponding contact center queue 123 may also be created in step 404. The size (the number of communications and/or type of communications that can be held in the contact center queue 123) of the one or more contact center queues 123 may also be determined based on the impact on the contact center 120. For example, for a higher impact, the size of the contact center queue 123 may support a higher number of voice calls that can be held in the contact center queue 123. The new contact center queue 123 may support multiple types of communications (e.g., voice/video/virtual reality). This may also vary based on the type of impact on the contact center 120. In one embodiment, instead of creating a new contact center queue 123, the information manager 127 may assign the new skill group 123 to an existing contact center queue 123. If the contact center 120 is a queue-less contact center 120, a contact center queue 123 will not be created in step 404. The process then goes to step 304.

Figure 5:
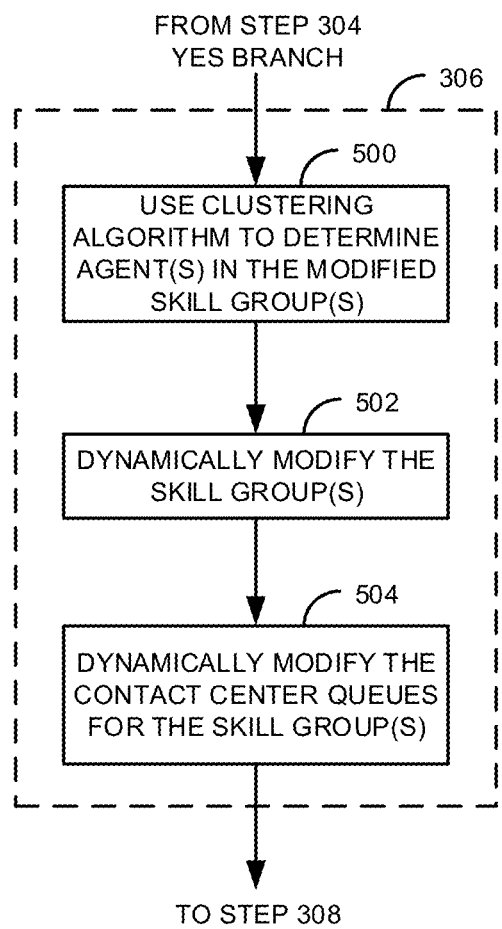
FIG. 5 is a flow diagram of a process for dynamically modifying skill groups/contact center queues in a contact center.

FIG. 5 is a flow diagram of a process for dynamically modifying skill group(s) 124/contact center queue(s) 123 in a contact center 120. FIG. 5 is a detailed view of an embodiment of step 306 of FIG. 3 in a contact center 120 that uses contact center queues 123.

After determining, in step 304, that one or more skill group(s) needs to be modified, the information manager 127 uses the clustering algorithm 125, in step 500, to determine agent(s) to add or delete from the one or more skill group(s) 124. The agents that are added or removed from the one or more skill groups 124 may be contact center agents 131 and/or automated agents 126. Based on the clustering algorithm 125, the information manager 127 dynamically modifies the one or more skill groups 124 in step 502. The information manager 127 may dynamically modify the one or more skill groups 124 by removing contact center agents 131 from one skill group 124 and adding the contact center agents 131 to another skill group 124. The clustering algorithm of step 500 may occur dynamically over time. For example, the clustering algorithm of step 500 may be applied based on new skills that a contact center agent 131 acquires that are associated with the skill group 124. The clustering algorithm may cluster in new contact center agents 131 that have completed training or agents that have already discussed the problem with a customer.

In addition, for a queued contact center 120, the information manager 127 may dynamically modify the size of and/or change a contact center queue 123 associated with the modified skill group 124 in step 504. For example, if the information manager 127 may change the size of the contact center queue 123 by increasing or decreasing the number of communications that the contact center queue 123 may place on hold. The information manager 127 may modify the types of communications that the contact center queue 123 will hold. If the contact center 120 is a queue-less contact center 120, the contact center queues 123 will not be modified in step 504. The process then goes to step 308.

Figure 6:
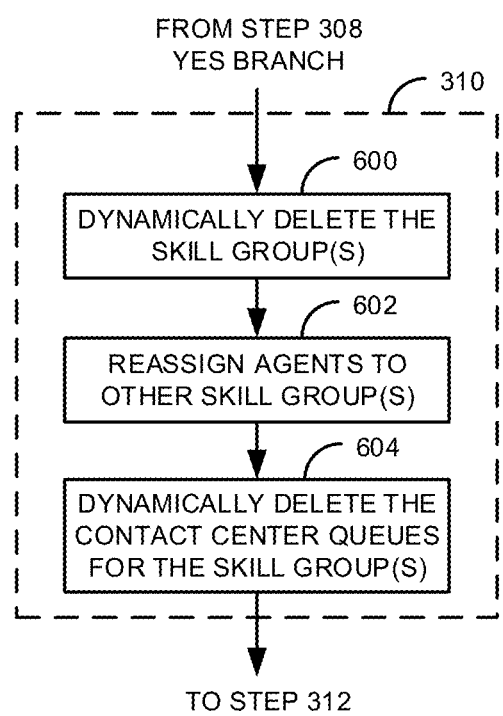
FIG. 6 is a flow diagram of a process for dynamically deleting skill groups/contact center queues in a contact center.

FIG. 6 is a flow diagram of a process for dynamically deleting skill group(s) 124/contact center queue(s) 123 in a contact center 120. FIG. 6 is a detailed view of an embodiment of step 310 of FIG. 3 in a contact center 120 that uses contact center queues 123. After determining, in step 308, that one or more skill groups 124 need to be deleted, the information manager 127 dynamically deletes the one or more skill groups 124 in step 600. The information manager 127 reassigns, in step 602, the agents in the deleted skill group(s) 124 to other skill group(s) 124.

The information manager 127 dynamically deletes, in step 604, the contact center queue(s) 123 associated with the skill groups 124. For example, the information manager 127 may delete a contact center queue 123 associated with a skill group 124 and change the size of an another contact center queue 123; in this case, the information manager 127 moves the contact center agents 131 that were in the deleted skill group 124/contact center queue 123 to the other contact center queue 123/skill group 124. The process then goes to step 312.

Figure 7:
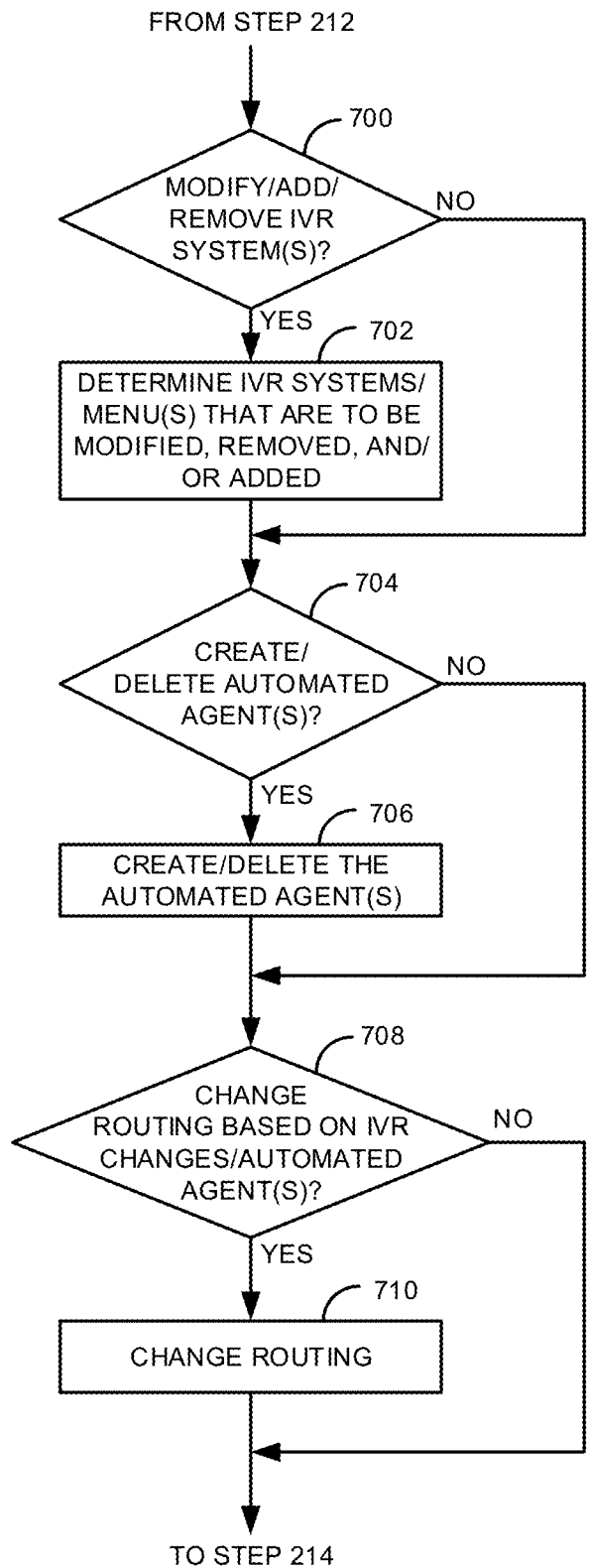
FIG. 7 is a flow diagram of a process for dynamically changing Interactive Voice Response (IVR) systems, changing automated agents, and changing routing based on the changed the IRV systems and the changed the automated agents.

FIG. 7 is a flow diagram of a process for dynamically changing Interactive Voice Response (IVR) systems 122, changing automated agents 126, and changing routing based on the changed the IRV systems 122 and the changed the automated agents 126. The process of FIG. 7 goes between steps 212 and 214 of FIG. 2. After dynamically creating, deleting, and/or modifying one or more skill groups 124 based on the impact to the contact center 120 the information manager 127 determines, in step 700, if the IVR system(s) 122 need to be modified, added, and/or removed. If there are no IVR systems 122 that need to be modified, removed, and/or added in step 700, the process goes to step 704. Otherwise, if there are IVR systems 122 that need to be modified, removed, and/or added in step 700, the information manager 127 modifies, removes, and/or adds the IVR systems 122 in step 702 and the process goes to step 704.

The information manager 127 may modify, remove, and/or add IVR systems 122 based on various criteria, such as, increased/decreased demand in the contact center 120, based updated training of contact center agents 131, based on projected increase/decrease of demand in the contact center 120, based on input from the social media network(s) 140, the blog site(s) 141, the news feed(s) 142, the weather system(s) 143, and/or the like. For example, the information manager 127 may dynamically modify one or more IVR menus based on a new problem that was encountered for a newly released video game. The IVR menu may state that if you are experiencing the identified problem in the video game, then press one to be directed to a newly created skill group 124/contact center queue 123. The information manager 127 may add additional instances of the IVR system 122 to a skill group 124 based on positive review of a product in the social media networks 140/news feeds 142.

The information manager 127 determines if one or more automated agents 126 need to be created and/or deleted in step 704. If no automated agents 126 need to be created/deleted in step 704, the process goes to step 708. Otherwise, if the information manager 127 needs to create and/or delete one or more automated agents 126 in step 704, the information manager 127 creates and/or deletes one or more automated agents 126 in step 706 and the process goes to step 708.

The information manager 127 may create/delete an automated agent 126 based on various factors, such as, an increase/decrease in incoming emails to the contact center 120, a resolution of a problem that the automated agent 126 can now process, based information from the social media network(s) 140, the blog site(s) 141, the news feed(s) 142, the weather system(s) 143, and/or the like. For example, the information manager 127 may create one or more instances of the automated agent 126 to automatically respond to emails for a problem that has been solved; for example, where the automated agent 126 automatically responds to an email regarding a bug in a software program that has been resolved by a new patch that can be downloaded at a web site.

The information manager 127 determines, in step 708, if a change in routing in necessary based on the IVR system 122 changes/automated agent 126 changes of steps 702/706. If a change in routing is necessary, the change in routing is completed in step 710 by the communication router 121. For example, if a new IVR system 122 instance was created, the information manager 127 may place the new IVR system 122 instance in a skill group 124 and then route communications to the skill group 124 with the new instance of the IVR system 122. If an IVR menu has changed or been added, the information manager 127 may change routing based on the change/adding of the IVR menu. Likewise, if an instance of an IVR system 122 is deleted (e.g., based on deletion of a skill group 124), communications will no longer be routed to the instance of the IVR system 122. Similarly, if an automated agent 126 is added or deleted, the routing of communications will be changed based on adding or deleting the automated agent 126 in step 710. The process then goes to step 214.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network 110, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that program the microprocessor to:
    gather information in real-time from one or more information sources monitored by a contact center, wherein the gathered information is about a product and/or service managed by the contact center;
    analyze the gathered information in real-time to determine a first potential impact on communications with the contact center, wherein the communications with the contact center are routed based on a skill group;
    in response to determining that there is the first potential impact on the communications with the contact center, dynamically create a new skill group;
    dynamically create a new contact center queue for the new skill group; and
    route a new communication to an agent in the new skill group via the new contact center queue.

2. The system of claim 1, wherein the instructions further program the microprocessor to dynamically modify the skill group to form a modified skill group.

3. The system of claim 1, further comprising instructions that program the microprocessor to: analyze the gathered information in real-time to determine a second potential impact on the communications with the contact center and in response to determining that there is the second potential impact on the communications with the contact center, dynamically deleting the new skill group and the new contact center queue.

4. The system of claim 1, further comprising dynamically modifying the skill group, wherein dynamically modifying the skill group comprises dynamically modifying a first size of the skill group to a second size of the skill group and dynamically modifying a first size of a contact center queue associated with the skill group to a second size of the contact center queue associated with the skill group.

5. The system of claim 4, wherein dynamically modifying the first size of the skill group to the second size of the skill group comprises increasing a size of the skill group by adding one or more of contact center agents to the skill group and further comprising instructions that program the microprocessor to send a message only to the added one or more added contact center agents, wherein the message is about the product and/or service managed by the contact center.

6. The system of claim 1, further comprising instructions that program the microprocessor to dynamically modify one or more menu items on an Interactive Voice Response (IVR) system based on the gathered information in response to determining that there is the first potential impact on the communications with the contact center.

7. The system of claim 1, wherein dynamically creating the new skill group is based on one or more skills of a plurality of contact center agents that are input into a clustering algorithm.

8. The system of claim 1, wherein the agent in the new skill group comprises an automated agent that automatically responds to the new communication based the gathered information.

9. The system of claim 1, further comprising dynamically modifying the skill group and wherein dynamically modifying the skill group is based on a input from a contact center agent indicating that the contact center agent has completed training associated with the product and/or service managed by the contact center.

10. The system of claim 1, further comprising dynamically modifying the skill group, wherein dynamically modifying the skill group comprises routing an incoming communication of a first user to a group of other users who are in a virtual reality environment, and wherein the virtual reality environment allows the first user to converse with the other users and a contact center agent in the virtual reality environment.

11. A method comprising:
    gathering, by a microprocessor, information in real-time from one or more information sources monitored by a contact center, wherein the gathered information is about a product and/or service managed by the contact center;
    analyzing, by the microprocessor, the gathered information in real-time to determine a first potential impact on communications with the contact center, wherein the communications with the contact center are routed based on a skill group;
    in response to determining that there is the first potential impact on the communications with the contact center, dynamically creating, by the microprocessor, a new skill group;
    dynamically creating a new contact center queue for the new skill group; and
    routing, by the microprocessor, a new communication to an agent in the new skill group via the new contact center queue.

12. The method of claim 11, further comprising dynamically modifying the skill group to form a modified skill group.

13. The method of claim 11, further comprising analyzing the gathered information in real-time to determine a second potential impact on the communications with the contact center and in response to determining that there is the second potential impact on the communications with the contact center, dynamically deleting the new skill group and the new contact center queue.

14. The method of claim 11, further comprising dynamically modifying the skill group, wherein dynamically modifying the skill group comprises dynamically modifying a first size of the skill group to a second size of the skill group and dynamically modifying a first size of a contact center queue associated with the skill group to a second size of the contact center queue associated with the skill group.

15. The method of claim 14, wherein dynamically modifying the first size of the skill group to the second size of the skill group comprises increasing a size of the skill group by adding one or more of contact center agents to the skill group and further comprising, sending a message only to the added one or more added contact center agents, wherein the message is about the product and/or service managed by the contact center.

16. The method of claim 11, further comprising dynamically modifying one or more menu items on an Interactive Voice Response (IVR) system based on the gathered information in response to determining that there is the first potential impact on the communications with the contact center.

17. The method of claim 11, wherein dynamically creating the new skill group is based on one or more skills of a plurality of contact center agents that are input into a clustering algorithm.

18. The method of claim 11, wherein the agent in the new skill group comprises an automated agent that automatically responds to the new communication based the gathered information.

19. The method of claim 11, further comprising dynamically modifying the skill group and wherein dynamically modifying the skill group is based on a input from a contact center agent indicating that the contact center agent has completed training associated with the product and/or service managed by the contact center.

20. The method of claim 11, further comprising dynamically modifying the skill group, wherein dynamically modifying the skill group comprises routing an incoming communication of a first user to a group of other users who are in a virtual reality environment, and wherein the virtual reality environment allows the first user to converse with the other users and a contact center agent in the virtual reality environment.

* * * * *